Mar. 27, 1923.

L. L. KELLY
MATERIAL CONVEYER
Filed June 7, 1921

INVENTOR.
Loomis L. KELLY,
BY B. W. Kadel,
ATTORNEY.

Mar. 27, 1923.

L. L. KELLY
MATERIAL CONVEYER
Filed June 7, 1921

1,449,759

INVENTOR.
Loomis L. KELLY,
BY B. W. Kadel,
ATTORNEY.

Patented Mar. 27, 1923.

1,449,759

UNITED STATES PATENT OFFICE.

LOOMIS L. KELLY, OF NORFOLK, VIRGINIA, ASSIGNOR TO THE WELLMAN-SEAVER-MORGAN COMPANY, OF CLEVELAND, OHIO, A CORPORATION OF OHIO.

MATERIAL CONVEYER.

Application filed June 7, 1921. Serial No. 475,582.

*To all whom it may concern:*

Be it known that I, LOOMIS L. KELLY, a citizen of the United States, residing at Norfolk, in the county of Norfolk and State of Virginia, have invented certain new and useful Improvements in Material Conveyers, of which the following is a specification.

This invention relates to a device for use in the delivery of coal, ore or similar material from any one or more of a plurality of fixed bunkers or material pockets arranged along a pier or dock into a vessel which may be berthed alongside of the same. It is the practice to build such docks at a considerable elevation above the level of the vessel into which the material is to be loaded and the material may flow by gravity from the bunkers into the vessel or may be assisted in its descent by suitable mechanical means such as a belt or a conveyer in cases where the difference in elevation is not sufficient for gravity delivery. Among the objects of the present invention is to provide a conveying device which may be moved from one pocket to another along the pier and which will permit of the employment of gravity for the purpose aforesaid in cases where the difference in elevation is relatively small and where mechanical conveying means would otherwise be necessary. Other objects are to provide a side wall conveying device movable along the pier and arranged to take up limited space when moved along the same, also one that may be folded up to clear a vessel berthed alongside of the dock when the conveyer is moved. A still further object is to provide an extremely flexible system adapted to serve vessels of varying heights and for the accommodation of hatch-way limitations generally.

The device is particularly adapted for use with mechanical trimming machines of the type used at the foot of a gravity or mechanically actuated leg for throwing the material laterally from the leg to great distances, as into the hold of a vessel. Another object of the invention therefore is to provide a movable material transfer outfit suitable for conveying material from overhead pockets into such a trimming machine affixed to and carried by the present mechanism.

A still further object is to provide a material handling device having a boom outstanding from the pier face with portions of the conveying system suspended therefrom, and associated therewith certain arrangements of cables, drums and sheaves as will produce a device of improved form especially adapted to the service.

With these general and other more specific objects in view such as simplicity, sturdiness and accessibility of parts, the invention consists of the formation, combination and arrangement of elements as will be herein set forth and particularly pointed out in the appended claims.

In the accompanying drawings which show a preferred embodiment of the invention, Figure 1 is an end elevational view of a movable conveyer constructed in accordance with the present invention, the view showing in dotted outline the one side of a pier upon which the outfit is mounted, the pier having overhead bunkers which are to be served by the conveyer.

Figure 1:
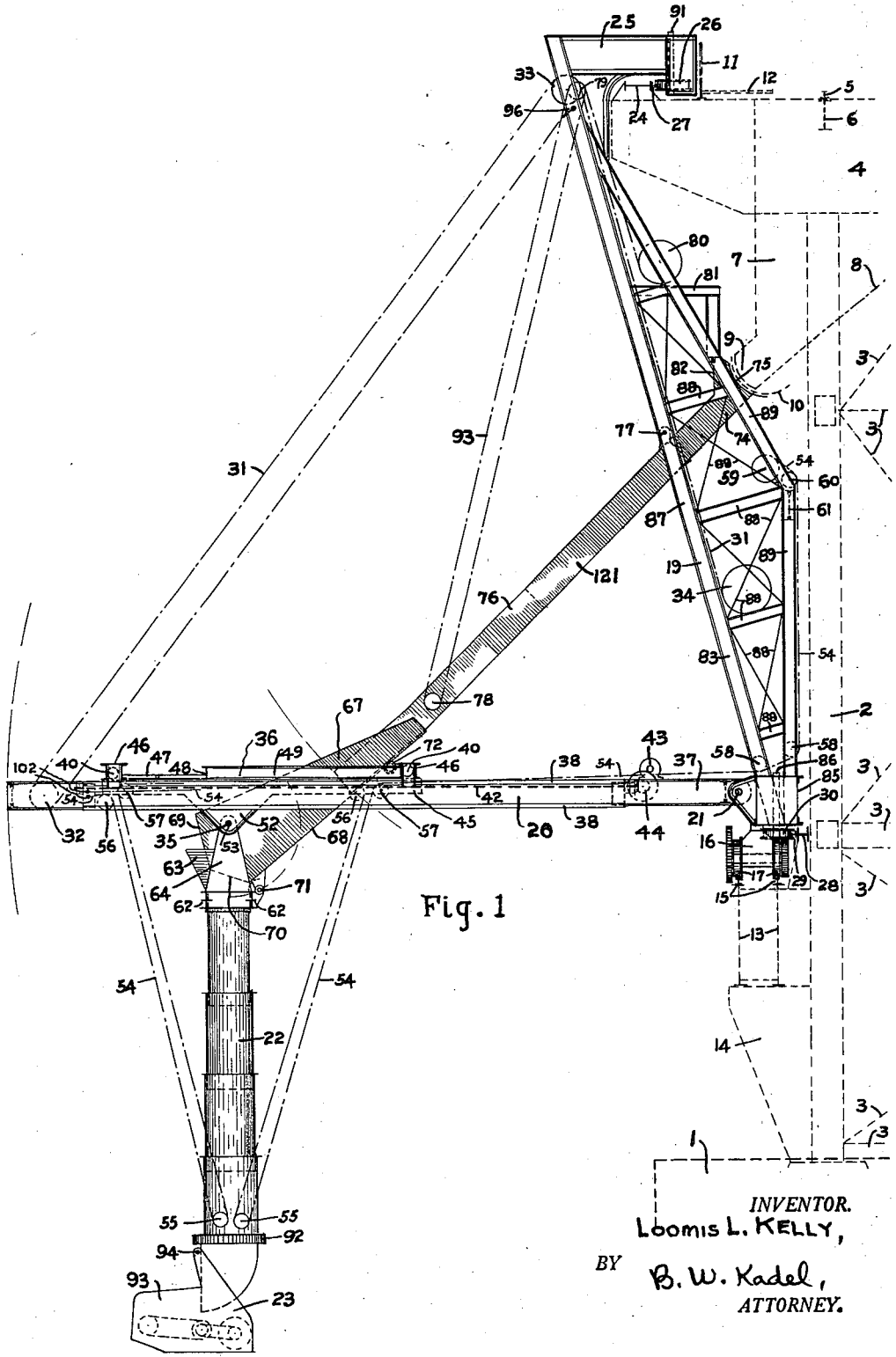

Referring to these drawings, the pier, which is shown for explaining the construction and co-operation therewith of the traveler, to which the present form of the device is particularly adapted, is depicted as having a base 1, vertical side columns 2, lateral brace members 3, and a top deck 4. Upon the deck are runway rails 5 which may be supported upon suitable girders 6. The runway rails are arranged to accommodate a material car, such as an ordinary railway car or the like, which may be elevated by any suitable means to the deck. Located immediately beneath the runway rails 5 are material pockets or bunkers 7 which are arranged longitudinally along the side of the pier. These have outwardly sloping bottoms 8 and at their lower outside edges are provided with discharge openings 9, which are ordinarily controlled by means of gates such as 10. The hand rail 11 and walkway 12 may be supplied for the safety of the operators. Piers of this type are well known and in common use, particularly where coal or ore is to be dumped or unloaded into ships, which latter may be berthed close alongside of the pier.

In order that the material may be readily conveyed, preferably by gravity, from the overhead bunkers down into the hold of the vessel, such piers are built to great heights, usually from 75 feet to 100 feet above the water level. It is the aim, however, to keep the deck of the pier at as low a level as possible, for it is usually necessary to employ mechanical power to elevate the cars containing the material to the level of the pier deck, and the great tonnage handled makes the problem of minimum deck elevation an important item of consideration on account of the cost of electrical or other power.

The present invention has not to do with the form of the pier itself, and the particular pier details shown in the drawings and heretofore described are selected for the purpose of explaining the association of the mechanism of the present embodiment of the invention therewith. It will be understood that the device may be arranged and worked out in such fashion as to convey material by gravity from any such bunkers to vessels or other receivers of maximum height, the pier being of minimum deck elevation. The device at the same time meets all of the other conditions incident to a movable conveyer in this service.

The pier structure, for the use now intended, should preferably be supplied with vertically loaded and longitudinally extending girders such as 13 near the base of the same and upon the outer face thereof, the girders being intended for the support and longitudinal traverse of the present material conveyer. The support of these girders may be upon bracket-like columns 14 affixed to the sides of the pier and preferably extending downward from the girders to the pier base. The pier columns such as 2 are located at spaced intervals along the pier and the brackets 14 preferably co-incide with the columns, the girders 13 extending continuously along the side of the pier, bridging from one bracket 14 to the next one. Upon the upper surface of the girders 13, which are preferably arranged in parallel fashion, are a pair of continuous runway rails 15, one disposed immediately over each web of the girders 13.

The conveyer is supported upon the girders 13, there being a supporting truck 16 at each end of the conveyer, each truck having four runway wheels 17 arranged in pairs mounted upon a common axle and of suitable gauge distance for operation upon and cooperation with the gauged runway rails 15. The conveyer, as heretofore explained, is arranged for longitudinal movement alongside of the pier upon these runway rails, and to this end each of the trucks 16 may be supplied with a motor 18 with suitable gearing for the rotation by electric power of the runway wheels 17, this effecting the traverse of the entire conveyer along the side of the pier.

The conveyer includes a frame work 19 which is mounted upon the trucks 16 and in the present embodiment is arranged in an outwardly inclined plane corresponding approximately with the outer face of the pier. This frame carries the entire mechanism of the apparatus, which includes a boom 20, the same being pivoted or hinged at its inner end to the frame 19 at 21, near the base of the latter in such fashion as to permit of its being swung upwardly into a position approximately parallel with the plane of the frame 19. Suitable cables and incidental equipment are supplied for supporting the outer end of this boom and for the manipulation of the same. A more detailed description of this portion of the mechanism will be given later.

A gravity chute 121 extends from a point beneath the discharge openings 9 of the material bunkers 7 to the boom and at the end of the chute 121 is a telescopic, vertical, gravity leg 22, this latter terminating in or having supplied at its lower end a mechanical trimming machine 23. The general object is to convey material from the bunkers 7 down the inclined gravity leg 121 to and through the vertical leg 22 which latter must always be some distance off-shore on account of the hatchways in the vessels. The mechanical trimming machine 23 is a power operated device arranged to throw the material to great distances radially. The present construction is particularly adapted for use with a trimmer of this type and is arranged in contemplation of the use of the same therewith. The trimmer 23 is arranged to be power-rotated about a vertical axis co-incident with the axis of the leg 22 so that the material may be delivered in any horizontal direction from the bottom of the leg by simply rotating the trimmer about the said vertical axis to the position desired. The gear rim 92 is supplied for this rotation. It is also arranged so that the lower portion 93 may be swung by power about the pivot point 94 into different positions.

It will be appreciated that the weight of any outfit suitable for handling large quantities of material in the afore described manner will necessarily be great, and the operative weight of the present device is therefore so great that special means must be provided to take care of the same upon the pier, not only vertically, as heretofore described for the runway wheels 17, but also to support the frame 19 laterally. To this latter end, the pier is supplied near its upper deck with a continuous plate girder or I beam 24 which lies in a horizontal plane and extends along the full active length of the pier. The frame 19 has horizontally arranged arms or other suitable loading carrying members such as 25 extending inwardly past the lines of the girder 24 and upon these arms are mounted runway wheels 26, one preferably near each end of the frame 19. The arms 25 may be connected by suitable truss members such as 95 for stiffening the structure. The wheels 26 are arranged to operate against a continuous runway rail 27 which is mounted upon the girder 24. Axles such as 91 may be supplied for the wheels 26.

By this means the over-turning force from the upper end of the frame-work, due to the load and to the pull of the cables, is taken care of. In order to take care of the inward reaction from the same forces a continuous girder 28 is supplied upon the side of the pier near the base of the frame 19. This girder also lies in a horizontal plane and extends for the full active length of the pier. Upon it is mounted a continuous runway rail 29 and against this latter a pair of thrust wheels 30 bear, these wheels being carried by the frame 19 with suitable axles 86.

It will thus be seen that the conveyer comprises, in the present embodiment, an inclined frame mounted in movable fashion adjacent the outer face of the pier, the same carrying a rising and falling boom and suitable gravity conveying devices which will be moved with the traverse of the conveyer as a whole from one bunker to another, as they may be desired. The weight of the outfit is carried near the base and the outward reaction from the reach of the boom is taken near the top of the conveyer and the inward reaction near the base of the conveyer.

Figure 3:
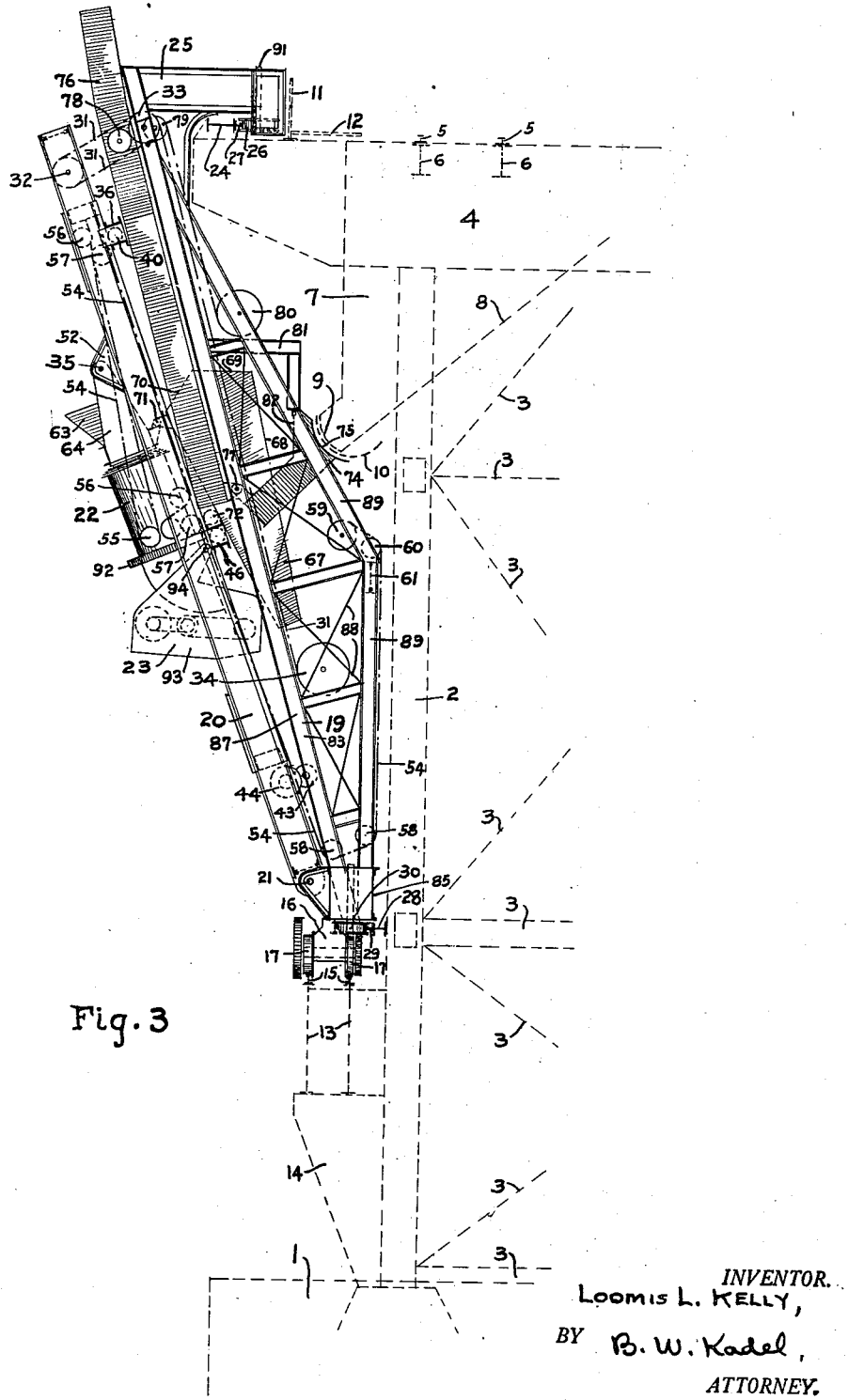
Figure 3 is an end elevational view showing the outfit from the same end as in Figure 1 but with the mechanism folded up ready for transit along the pier and alongside of a vessel.

One of the objects of the invention being to provide such a device that may be so folded up as to occupy only a very small space alongside of the pier, the construction of the mechanism to this end will now be described:

It is necessary not only that the framework 19 be arranged to occupy but a small space alongside of the pier and that the boom 20 be hinged thereto as at 21, with suitable arrangements for raising the outer end of the boom so that the latter will occupy a folded position approximately parallel with and up against the outer face of the frame 19, but that the material-conveying elements such as the chute 121 and the leg 22 be also arranged to be folded up or otherwise concentrated into a small space, these portions to be so associated with the frame work and the boom as to permit the entire mechanism to be folded up at the same time. Various of the novel features of the invention are directed to this end and the device is shown in Figure 3 with the parts so folded together. It is also necessary that the conveying mechanism be so arranged as to permit of its being elevated, that is, to bring the trimming machine to any desired level from a predetermined maximum to minimum point; also that the vertical leg 22, together with the trimming machine, may be moved along the boom 20 as desired; all of which manipulations are necessary in a mechanism of the flexible character necessary to serve the various types of vessels coming up to such piers to be loaded.

The vertical position of the trimmer 23 is controlled in two manners; first, by raising or lowering the boom 20 through a limited operative arc; second, by a telescoping of the vertical leg 22 to a greater or less amount. By this means the vertical position of the trimmer can be controlled to any position necessary. In ordinary practice the end of the boom may be raised about 8 ft. above the horizontal position shown in the drawings and still maintain the flow of material such as coal, by gravity, down the chute 121. It is also contemplated to lower the end of the boom approximately the same amount below the horizontal position for extremely low conditions. It is to be understood, of course, that the boom may be elevated to the completely folded position shown in Figure 3, but the operative range of the end of the boom, that is, the range through which it is contemplated it will be manipulated in service for controlling the vertical position of the trimmer 23, is through a range of approximately 16 ft. as afore mentioned.

Figure 2:
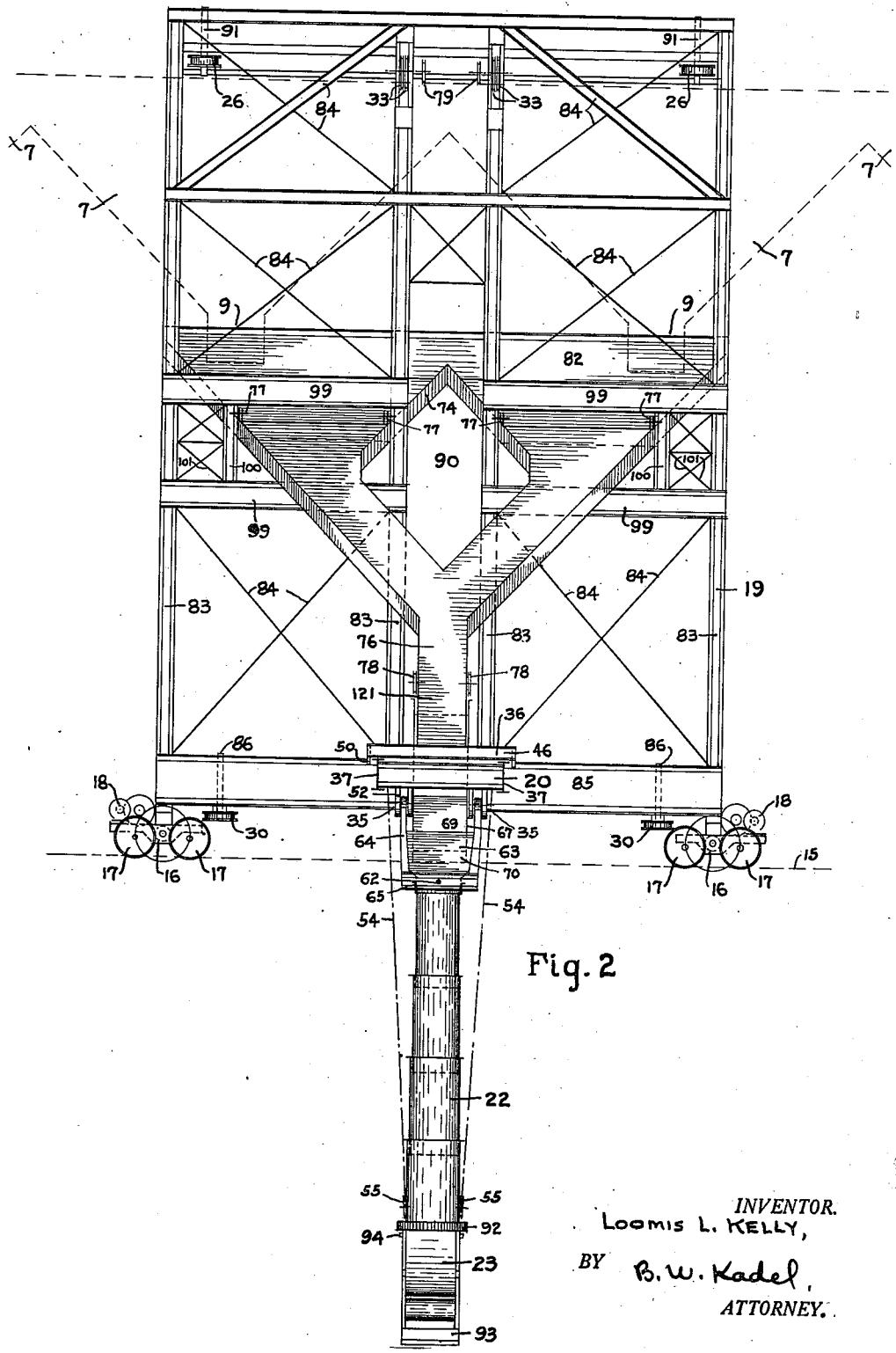
Figure 2 is a front elevational view of the same, looking directly toward the side face of the pier, portions of the pier being shown in dotted outline in this figure also.
Figure 7:
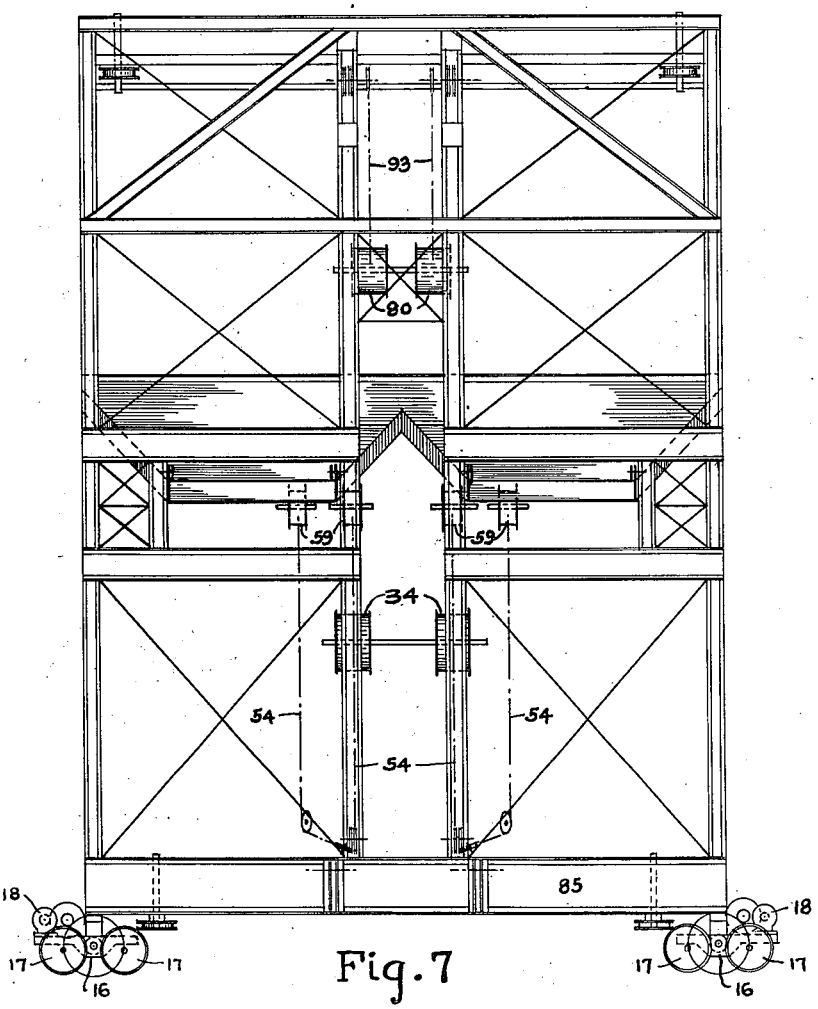
Figure 7 is a partial front elevational view with the boom and the chutes of the device omitted.

The rising and falling of the boom will be controlled by means of two cables 31, each of these may pass in multiple strand fashion around a set of sheaves 32 journalled upon the outer end of the boom, one extending from each side of the boom near its end, to the top of the frame work, and thence around a set of sheaves 33 attached to the frame work near its top, and thence to one or more winding drums 34 carried at a lower point on the framework. The dead ends of the cables are anchored to the frame as at 96. These drums may be driven by suitable power such as electric. One of these cables 31 is indicated in Figure 1 but it is contemplated to use a pair of these, the two sets of sheaves 33 such as indicated in Figures 2 and 7 being supplied for the two cables.

Figure 4:
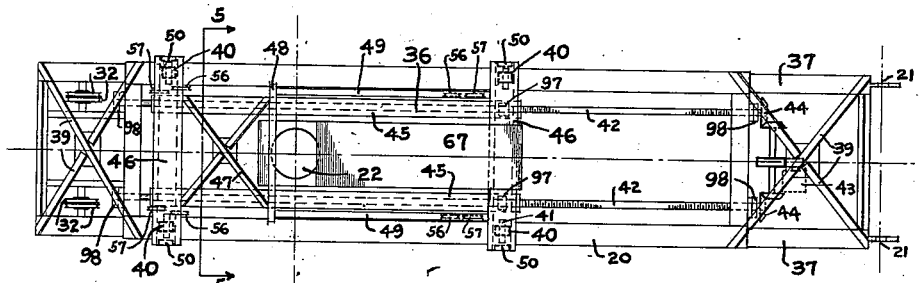
Figure 4 is a plan view of the boom of the device.
Figure 5:
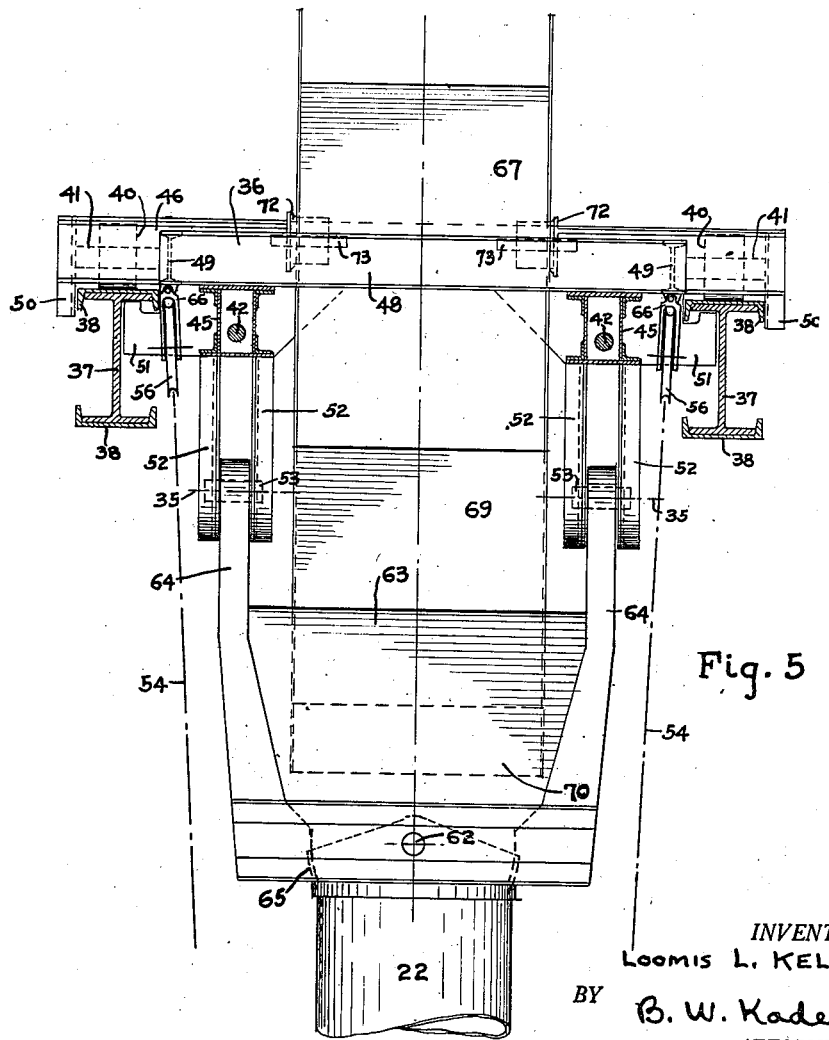
Figure 5 is a transverse vertical section taken through the boom, approximately on the line 5—5 of Figure 4, this view being somewhat enlarged over the scale of the previous figures.
Figure 6:
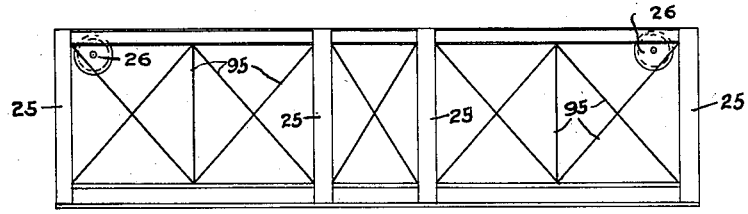
Figure 6 is a partial plan view showing the top of the frame of the device.

The vertical leg 22 is hinged in pivoted fashion at 35 upon a carriage 36 which is mounted upon the upper face of the boom 20 and arranged for traverse along the same. The boom itself is formed of two vertically loaded girders 37 formed of I sections which may be re-inforced at their tops and bottoms with channel members 38, these girders being arranged in spaced relationship, with an intervening space, and preferably with X bracing such as 39 near each end, to tie the two girders of the boom together laterally. The girders of this construction can be seen most clearly in Figures 4 and 5. The girders as thus arranged should be of ample strength to support considerable vertical load, inasmuch as they must function as beams, supported by the cables 31 at the outer end, and at the pivots 21 at the inner end, much weight is imposed upon these members from the carriage 36 and the associated portions of the conveying apparatus. The carriage 36 is provided with four flat faced rollers or wheels 40 which transfer the load of the carriage to the top surfaces of the girders of the boom and permit of the movement of the carriage along the boom. Suitable axles such as 41 will be provided for these rollers.

The traverse of the carriage 36 along the boom 20 is effected by means of a pair of motor driven screws 42 which are actuated by means of the motor 43 through suitable gearing such as 44. By this means the carriage may be readily moved from one position along the boom to another and at the same time it will remain at any desired position due to the inability of the screws to reverse themselves. The screws pass operatively through captive nuts 97 carried by the carriage 36 and thrust bearings 98 may be supplied at each end of the screws.

The carriage 36 itself is formed of a structural steel framework consisting of a pair of box girders 45 arranged in spaced parallel fashion, these being let in between the girders 37 forming the boom 20. These are connected near each end by means of box girders 46 which are suitably secured to the girders 45 and, extending outside of the lines of the girders 45, they over reach the lines of the boom 20, the girders 46 being disposed above the tops of the boom girders 37. A set of X brace members such as 47 may be utilized to hold this frame in shape, and a cross beam 48 is also supplied near one end of the frame work, the same resting upon the box girders 45 and overreaching the same slightly, but not to the full extent of the cross girders 46. A pair of I beams 49 extend longitudinally of the carriage from the ends of the cross beam 48 to one of the cross girders 46, the ends of these being supported respectively by the cross beam 48 and the cross girder 46. This framework serves for supporting certain cable sheaves hereinafter described, the I beams being located above the lines of the carriage, as defined by the girders 45, giving extra head room for the said sheaves.

Lateral aligners or guides 50 extend down from the outer ends of the cross girders 46 to slightly below and outside the lines of the boom girders 37, these being preferably formed of short, vertically arranged lengths of structural channel set into the ends of the box girders 46. In order to prevent tipping up of the carriage and to prevent any displacement thereof with respect to the boom when the mechanism is folded up, arms 51 may extend from near the ends of the cross girders 46 to positions beneath the upper flanges of the boom girders. These will be clearly seen in Figure 5 where they are shown with their ends extending outwardly from the central portion of the carriage to positions beneath the inturned upper flanges of the I beams 37, being cut away to clear the down turned inner flanges of the upper re-inforcing channels 38. These arms thus serve also with the aligners 50, for preventing lateral displacement of the carriage upon the boom.

As before stated, the vertical leg 22 is supported at 35 upon the carriage 36, there being extensions, or arms, such as 52, depending from the girders 45 of the carriage 36. Suitable pivot pins such as 53 may be utilized for the connections at these points. The vertical leg 22 is thus free to be swung about the pivot point 35 as a center, or in and out without respect to the pier. This leg is made in the form of a telescopic chute, the various sections being arranged to telescope within one another so that it may be extended or contracted as the case may demand for the proper vertical location of the trimming machine 23.

This telescopic action is controlled by means of the four cables 54. Two of these cables are arranged along each side of the boom 20, being anchored thereto near the outer end of the boom as at 102. The cables occurring as a pair along one side of the boom, are indicated in Figure 1, the upper of these two cables being provided for the shore side of the leg 22 and the lower one being for the off-shore side thereof. There being a similar arrangement of cables along the other side of the boom, it will be seen that the four cables 54 are available for attachment to the leg 22 in spaced fashion and that they may extend, in guying fashion, in diagonal lines from the four corners of the carriage 36 to corresponding quarters of the lower end of the leg 22.

The harnessing of these cables to and about the carriage 36 is one of the features of the invention, for while the outer ends of the cables are anchored to the boom and the winding drums 59 for the cables are affixed to the frame-work 19, the arrangement is such that the carriage 36 may be moved upon the boom without slacking off or taking up the cables 54. To this end, there is journalled to each corner of the carriage 36, a pair of sheaves 56 and 57, these being the ones aforementioned as hung upon the I-beams 49. Swiveling hangers 66 should be supplied for this purpose to allow the sheaves to adjust themselves to various directions of the cables as when the mechanism is folded up.

The harnessing of each cable is identical, except for the location of the parts, hence a common description will serve for all. The dead end of each cable 54 being attached to its respective side of the boom, it then passes to a corner of the carriage 36 corresponding with the quarter of the leg 22 it is adapted to serve, where is passes over its sheave 56 and from this in diagonal fashion downward to and around a sheave 55 carried on an appropriate quarter of the lowermost section of the telescopic leg 22. From here the cable returns again to its respective corner of the carriage 36 where it is passed around a sheave 57 and thence back along the boom to and around one or more sheaves 58 near the pivot 21, and thence upward along the frame-work 19 to one of the winding drums 59. One winding drum is furnished for each of the cables and these are preferably independently controlled. The driving source may be electric or any other suitable power. Adjacent to each winding drum is a fleeting sheave 60 for each cable, arranged to direct the cable and to have sufficient play along the axis of the drum to insure the proper winding of each cable upon its drum. A vertically arranged girder such as 61 may be supplied for supporting the fleeting sheaves and the drums.

It will be noted, as before stated, that the cables 54 extend in diagonal lines from the corners of the carriage 36 to the bottom of the telescopic leg. These cables thus not only stay and guy the leg 22 but can be manipulated to control the telescoping of the chute and also to cause the vertical leg to swing in and out with respect to the pier to any desired angle within a pre-determined range. They serve to stay the lower end of the leg 22 against the movement due to the reaction from the throwing effort of the trimming machine 23. This trimmer may be rotated in any direction about the vertical axis of the leg 22 as a swiveling axis, and as the trimmer is arranged to throw the material to great distances away from the leg, it will be appreciated that the horizontal reactions from this effort against the lower end of the leg 22 are of considerable moment. By arranging the cables 54 at an angle in the two directions as shown in the drawings, the lower end of the leg 22 is suitably stayed against movement from this reaction, no matter in what direction the trimmer may be turned.

When the carriage 36 is caused to traverse the boom 20 through rotation of the screws 42 it is not necessary to operate the drums 59 as the sheaves carried by the carriage simply roll along the cables without necessitating any change in cable lengths. There will furthermore be no change in the elevation of the trimming machine. When it is desired to elevate the trimmer by shortening or telescoping the leg 22, all four of the drums 59 are rotated, preferably in unison. When it is desired to swing the trimmer toward or away from the pier, the two drums controlling the cables to the pier side or to the off-shore side of the leg are rotated to shorten the respective cables, which will cause a swinging of the leg 22 about the pivot point 35 in the direction desired, or the opposite cable may be slacked off to effect the same result.

The leg 22 may be similarly swung to a limited distance transversely of the boom 20 by proper manipulation of the cables at one side or other of the leg. In this case the leg swings about a pivoting axis 62 arranged in the proper direction near the top of the leg, the axis 62 being substantially at right angles to the pivoting axis 35. It will be understood that the leg 22 is a plain tube, and arranged for the fall of the material through the same by gravity. The upper end of the leg is formed as a material receiving hopper 63 which is supplied with side wall extensions 64, in the upper extremity of which are located the pivot points 35.

The main tubular portion of the leg extends downward from this upper or hopper portion and is attached thereto by means of the pivot 62 aforesaid, the same lying in lines at right angles to the pivots 35 as before mentioned. The leg 22 may thus be swung in any direction by movement about one or both of these pivots. The joint between the upper section of the leg 22 and the hopper 63 is made of suitable curved shape, as at 65, to permit the movement desired about the axis 62.

In order to direct the material into the hopper portion 63 of the leg 22 a chute box 67 is supplied which receives the material from the lower end of the chute 121 and conveys it by gravity into the hopper 63. This chute box is disposed between the box girders 45 of the carriage 36 and accordingly lies between the two girders which constitute the boom 20. It has a closed bottom 68 and a closed outer end 69 to prevent material from being carried out beyond and over-running the hopper 63. The discharge opening of the chute box is directly over the leg 22, as indicated at 70 in the drawings.

The lower end of this hopper or chute box is supported upon the leg 22 or, in detail, upon the hopper portion 63 thereof, being pivoted to the said hopper portion at the point 71 which lies beneath the bottom of the chute box and to the pier side of the hopper 65. This pivot connection is provided for allowing the necessary adjustment of the parts when the leg 22 is swung, and also for the folding up purpose which will be described later. The upper end of the chute box 67 rests loosely upon the carriage 36, rollers such as 72 being provided for the support, inasmuch as there is some movement of the chute box with respect to the carriage 36 when the foregoing operations take place. The rollers 72 are suitably journalled upon the carriage 36 as by means of the axles 73.

It will be noted that the guide sheaves 58 for the cables 54 are located above the boom pivot 21, so that as the boom is raised the cables 54 will be released rather than shortened. This prevents any straining or breaking of parts as might occur were the cables 54 otherwise arranged, or so arranged that folding up of the boom with the leg 22 fully telescoped would tend to shorten these cables.

The inclined material chute 121 may in effect be considered as formed in three sections, the chute box 67 constituting the lowermost section and the uppermost section 74 being permanently affixed to the frame 19. This upper section 74 has at its upper end a hopper-shaped mouth 75 which extends for approximately the full length of the frame 19 along the pier, or for enough distance to slightly more than overreach two adjacent bunker openings 9. By this means it will be noted that no matter where the conveying outfit may be stopped alongside of the pier, the hopper mouth 75 of the chute 121 will always be under one and sometimes under two of the bunker openings 9.

This portion 74 of the chute 21 is closed, and as aforesaid, is immovably fixed to the frame 19. On its upper inclined face and near the lower end thereof, there are formed hinge members to which is co-operatively hinged the intermediate portion 76 of the chute 121. The hinges of the latter portion of the chute are on the upper inclined face thereof and near the upper end of the same. These hinge members are provided so that the portion 76 of the chute may be swung upward against the frame 19 in the folding operation, the swinging taking place about the pivot point 77 of the hinges. In swinging up the open upper end of the portion 76 swings away from the open lower end of the portion 74. When the portion 76 is let down again into operative position the upper end of the same is arranged to receive the slightly smaller lower end of the portion 74.

The lower end of the portion 74 of the chute is supported upon a parallel set of horizontal girders 99 extending from an end upright 83 to the adjacent center upright. These uprights are portions of the frame work 19 and will be described in detail hereinafter. The hinge members are located between these girders, some of them near the center upright 83 and others near short struts 100 which may be let in between the girders 99. The hinges carry considerable load and they are thus located at points adapted to resist the forces therefrom. Trussing 101 may fill out the space between the struts 100 and the end uprights 83 to complete the general trussing of the frame 19.

The lower end of the portion 76 of the chute may be controlled as to elevation by means of the direct support of the cables 93. This lower end fits within and discharges into the chute box 67, and in cases where the cables 93 are excessively slacked off, the lower end of this member 76 may be carried upon the chute box. This is desirable when it is contemplated to move the carriage 36 along the boom during the operation of the device, for the portion 76 of the chute will thus automatically adapt itself to the changing positions of the chute box.

The folding of the portion 76 of the chute is effected by means of the cables 93 which extend in two strand fashion from fixed points near the top of the frame work down to and around sheaves 78 carried upon the sides of the chute, thence back again to the top of the frame work 19 and around sheaves 79, thence down along the frame work to a motor driven drum 80 which is preferably mounted upon a platform 81 formed upon the frame work. The platform 81 is preferably supported by a vertically loaded plate girder 82 which extends along and may form one wall of the hopper portion 74 of the chute 121. It will be understood that this plate girder also serves as a supporting means for the portion 74 of the chute itself.

The frame work 19 should be formed in a special manner to accommodate the various parts of the device, for it will be appreciated that the entire mechanism is carried upon this frame work and it is subject to many different forces. It must also be specially constructed to take care of the several parts when in folded positions. It has heretofore been explained that the entire traveler conveyor is bottom-supported; that is, that the weight of the entire device rests upon the trucks 16. It is therefore necessary that the frame be suitably constructed to transmit all of the weight from the upper portion of the structure to the base. To this end there are supplied four columns or uprights 83. One of these is disposed at each end of the framework and substantially over the center of each of the trucks 16. The other two are located near the center of the device but spaced slightly from each other so as to accommodate therebetween certain portions of the outfit when the device is in operative position and also when it is folded up.

Suitable trussing such as 84 is supplied between each end upright 83 and the adjacent intermediate upright 83, so as to stiffen the entire device in a direction along the pier.

Extending along the bottom of the frame work 19 and forming a base for the entire structure is a box girder 85 arranged to support the uprights and transmit the load therefrom to the trucks 16. The pivots 21 for the boom are also carried by this box girder and it is arranged in such fashion as to have considerable lateral strength as well as great vertical strength. The thrust wheels 30 are also carried upon this box girder, suitable axles 86 therefor being shown. It will be understood that this box girder extends for the full length of the frame work, spanning from one truck 16 entirely to the other.

The frame work 19 is also subjected to a considerable transverse force. To resist this, the end uprights 83 are formed in truss fashion as may be seen in Figures 1 and 3, there being front chord members such as 87 which may serve as the tension members in the truss action and rear chord members such as 89 which may serve as the compression members in truss action. Suitable strut or tie members such as 88 should be supplied for completing the trusses. These end trusses serve to resist the forces that are applied to the frame work laterally of the pier, the plate construction of the portion 74 of the chute acting as a girder to carry such loads from the center of the frame work out to the end uprights 83. The hoppers and the chutes render it impractical to form the center uprights 83 as trusses.

The operation of the material conveyer can be generally understood from the description of the structure heretofore given, but in order to more fully explain the functions and operation of the various parts the following operative description is given:

The device is moved, as a whole, along the pier, the entire mechanism being folded up into in-operative position, until it is in a position along the pier where the leg 22 may be let down into the desired hatchway or opening of the vessel to be loaded. The length of the hopper portion 74 of the chute 121 being slightly greater than the overall dimension across adjacent bunker openings 9, the conveyer will always be left standing in a position where either one or two bunker gates register with the hopper 74. The device will now be unfolded into operative position and the leg 22 let down into the hold of the vessel, the trimming machine 23 being already attached and ready for operation. The trimming machine 23 is set in motion for the lateral delivery of the material and the correct gates 10 are opened, the material flowing by gravity down the closed chute 121, through the open chute box 67 thence down the leg 22 to the trimming machine, where the delivery is completed. When sufficient material has been delivered in that opening, the device is moved to another and in this process of moving, as for example from one vessel to another, it is often necessary to fold up the device into in-operative position to clear the superstructure of the vessel.

This folding up being a special feature of the invention, the operation will now be described:

The first act on folding up the device may be to rotate the four drums 59 in unison, thereby telescoping the leg 22 into a minimum of space. The drum 80 is next rotated, thereby swinging up the outer end of the chute 121 about the hinge point 77 so that this portion of the chute lies in a position substantially parallel with the members 87 of the frame 19. The next operation is to rotate the drum 34, thereby raising the outer end of the boom 20, through the cables 31, into a position substantially parallel with the framework 19.

When the boom is being raised, the telescoped leg 22 will tend to swing by gravity about the pivots 35, into a vertical position or parallel with the raised boom. By now releasing the outer set of cables and further taking up the inner set of cables, the telescoped leg may be drawn up against the boom 20 and partly between the parallel girders 37 thereof until the leg itself, or the trimmer, contacts one of the cross girders 46 of the carriage 36. It will be understood that the swinging of the leg 22 into position parallel with the boom may be done while the boom itself is being raised to prevent any undue strain in the cables 54. The trimming machine should be swung into a position where it also will fit in between the parallel girders 37 of the boom and may furthermore extend slightly between the spaced intermediate uprights 83 of the frame 19. The lower portion of the trimmer should be racked back to the position shown in Figure 3 in order to reduce the space occupied.

It will be noted that the upper or hopper portion of the chute 121 is made in bifurcated fashion, or in other words, with a boxed opening 90 through the hopper, with channels for the flow of the material along the side of said opening. This opening is adjacent the line of the hinge members 77 and the center uprights 83 may pass through it, thus removing them from interference with the flow of the material. While this opening might with good reason be formed in this hopper to reduce the weight, there being sufficient and effective conveying channels for the material around the opening and without utilizing this space for hopper volume, and while it is desirable to provide it for the passage of the uprights 83 therethrough as aforesaid, yet it has an important function in addition to these in that it accommodates the chute box 67 when the device is folded up. It has heretofore been explained that the chute box 67 is supported in pivotal fashion upon the leg 22, the upper end resting upon the rollers 72. When the leg 22 is swung into a position parallel with the boom, as shown in Figure 3 and as heretofore described, it will be seen that the lower end of the chute box will be lifted up with the swinging of the leg 22, the bottom of the chute box at the same time moving longitudinally of the boom upon the rollers 72. By this action the chute box is lifted into a position considerably above the boom and above the carriage 36, so that when the boom is lifted up into a folded position the opening 90 just described forms a pocket for the reception of the chute box 67. It must also extend between the spaced uprights 83 of the framework. The cross beam 48 of the carriage 36 must be so located as to clear the corner of the chute box during the folding operation. It will also be noted that the drum 80 is above the chute. This allows the motor platform 81 to be so arranged that the end of the chute box 67 will fit in beneath it when in folded position.

It will thus be seen that I have provided a material conveyer of novel design and peculiarly adapted to the particular service. Various modifications in the practical embodiments of the invention are contemplated, within the scope of the appended claims, without departing from the spirit thereof.

What is claimed is:

1. In combination with a pier having longitudinally arranged material pockets with spaced discharge openings in the sides thereof, a material-conveying apparatus mounted for transit alongside of the pier, the same including a frame carrying a receiving hopper of sufficient length to embrace a pair of adjacent pocket openings, and a discharge chute carried by the frame and extending downwardly from the said hopper, the lower end of the same being capable of a limited movement along the pier independently of the carrying frame.

2. In combination with a pier having longitudinally arranged material pockets with spaced discharge openings in the sides thereof, a material conveying apparatus mounted for transit alongside the pier, the same including a frame carrying a receiving hopper of sufficient length to embrace a pair of adjacent pocket openings and a discharge chute carried by the frame and extending downwardly and outwardly from the said hopper.

3. In combination with a pier having longitudinally arranged material pockets with discharge openings therein, a material-conveying apparatus mounted for transit alongside of the pier, the same including a frame with a rising and falling boom pivoted thereto near the base of the said frame, a material delivery leg carried by the boom, a material chute supported at the upper end upon the said frame and arranged for support at its lower end upon the said leg.

4. In combination with a pier having longitudinally arranged material pockets with discharge openings therein, a material-conveying apparatus mounted for transit along side of the pier, the same including a frame, a boom pivoted to the frame, a vertically arranged material delivering leg carried by the boom and movable along the same, and an inclined material delivering chute supported at its upper end upon the said frame and adjustably supported over the said leg at its lower end, the said chute being adapted in one position thereof to receive material from one or another of the said discharge openings and deliver it into the said vertical leg.

5. In combination with a pier having longitudinally arranged material pockets with discharge openings therein, a material-conveying apparatus mounted for transit along side of the pier, the same including a frame, a boom pivoted to the frame, a vertically arranged material handling leg pivoted upon the boom, the same being movable along the boom and arranged for vertical adjustment with respect to the boom, and an inclined material-conveying chute supported at its upper end upon the said frame and adjustably supported over the said leg at its lower end, the said chute being adapted in one position thereof to receive material from one or another of the said discharge openings and deliver it into the said vertical leg.

6. In combination with a pier having a material pocket with a discharge opening therein, a chute supported adjacent the said pocket and arranged to receive material therefrom and to convey it away from the said pocket, the said chute being formed in a plurality of sections and having an opening formed through the body of one portion of the same, one of the said sections being hinged with respect to another section in such manner as to be folded into an inoperative position, the said opening being arranged to accommodate a portion of one of the sections of the said chute when in folded position.

7. In combination with a pier having longitudinally arranged material pockets with discharge openings therein, a material-conveying apparatus mounted for transit alongside of the pier, the same including a frame with a rising and falling boom pivoted thereto, a material conveying chute carried by the said frame, the same being arranged in a plurality of sections capable of movement with respect to each other, one of said sections being carried by the boom and another directly by the said frame.

8. In combination with a pier having longitudinally arranged material pockets with discharge openings therein, a material-conveying apparatus mounted for transit alongside of the pier, the same including a frame with a rising and falling boom pivoted thereto, a material chute pivotably attached to the boom, a co-operating chute box pivoted upon the said chute, and means for conveying material from the said discharge openings to the said chute box.

9. In combination with a pier having longitudinally arranged material pockets with discharge openings therein, a material-conveying apparatus mounted for transit alongside of the pier, the same including a frame with a rising and falling boom pivoted thereto, the said boom being formed of two members arranged in spaced parallel fashion, with an opening therebetween, a material-conveying chute extending outward from the frame work and supported at its inner end directly upon the frame work and arranged for support at its outer end upon the boom, the said chute being disposed within the said opening between the parallel members of the boom.

10. In combination with a pier having longitudinally arranged material pockets with discharge opeings therein, a material-conveying apparatus mounted for transit alongside of the pier, the same including a frame arranged aproximately parallel with the outer face of the pier, a rising and falling boom pivoted upon the frame work, a plurality of independent operable material conveying chutes carried upon the frame work and upon the boom, means for controlling the rise and fall of the boom and for operating the said chutes, said means including a plurality of motor driven drums affixed to the said frame.

11. In combination with a pier having longitudinally arranged material pockets with discharge openings therein, a material-conveying apparatus mounted for transit alongside of the pier, the same including a wheel-supported frame with runways for the same, affixed to the pier near the base thereof, the said frame carrying horizontal thrust wheels near its top and bottom, and the pier having co-operating runways for the same along its face.

12. In combination with a pier having longitudinally arranged material pockets with discharge openings therein a material-conveying apparatus mounted for transit alongside of the pier, the same including a frame with conveying chutes associated therewith, the said frame being supported near its base and having a series of load carrying uprights extending from near the base to near the top of the frame, there being a girder arranged along the base of the said frame, the said uprights resting upon and being attached to the said girder.

13. In combination with a pier having longitudinally arranged material pockets with discharge openings therein, a material-conveying apparatus mounted for transit alongside of the pier, the same including a frame with a plurality of material chutes carried thereupon, the said chutes being arranged to be supported in outstanding fashion from the said frame when in operable position and to be folded up closely against the said frame when in in-operative position.

14. In combination with a pier having longitudinally arranged material pockets with discharge openings therein, a material-conveying apparatus mounted for transit alongside of the pier, the same including a wheel-supported frame having a plurality of uprights with an intervening space between adjacent uprights, a material-conveying chute associated with the frame and arranged to receive material from the discharge openings and to convey it therefrom, one portion of the said chute being permanently affixed to the frame and disposed in the aforesaid space between adjacent uprights and another portion of the said chute being arranged to be folded up with respect to the first mentioned portion and to occupy, when folded, a position within the said space adjacent the first mentioned portion of the chute.

15. In combination with a pier having a material pocket with a discharge opening therein, a chute supported adjacent the said pocket and arranged to receive material therefrom and to convey it away from the said pocket, a chute supporting member outstanding from the pier, a carriage movable along the said outstanding member, a material-conveying chute carried by the said carriage and arranged to receive material from the first mentioned chute, the same being adjustable with respect to the carriage, and means for controlling the said adjustment, the same including cables with winding drums for the same, the cables being anchored to the outstanding member at one end and extending therefrom to the winding drums, a plurality of sheaves mounted upon the carriage and the chute and arranged for co-operation with the said cables in such manner as to direct the latter in a diagonal path from the carriage along the outstanding member, and to permit movement of the carriage along the outstanding member without necessitating a change in cable length.

16. In combination with a pier having a material pocket with a discharge opening therein, a chute supported adjacent the said pocket and arranged to receive material therefrom and to convey it away from the pocket, a frame mounted upon the pier adjacent the said pocket, a boom pivoted upon the frame, the same being capable of movement with respect to the frame, a gravity leg mounted upon the boom and arranged for a plurality of movements with respect thereto, a plurality of cables arranged for effecting said movements and a plurality of drums arranged to receive the cables, the said drums being mounted upon the frame work and the cables extending from the boom thereto, with guide sheaves adjacent the point of attachment of the boom to the frame.

17. In combination with a plurality of material pockets, having discharge openings therein, a frame arranged for traverse alongside of the same, a member outstanding from the said frame, a gravity leg pivoted upon the said member, a chute extending from near the discharge openings of the said pocket to adjacent the upper extremity of the said gravity leg, and a hopper pivotally attached to the said gravity leg and having another point of support upon the said outstanding member.

18. In combination with a pier having longitudinally arranged material pockets with discharge openings therein, a frame mounted upon the pier adjacent the said openings and movable along the same, a hopper affixed to the said frame, a chute pivotally associated with the said hopper and extending outwardly with respect to the pier, a member outstanding from the said frame, the same carrying a gravity leg adjacent the lower extremity of the said chute, and a hopper interposed between the lower end of the said chute and the upper end of the said gravity leg.

19. In combination with a pier having longitudinally arranged material pockets with discharge openings therein, a frame mounted for transit alongside of the pockets, a hopper carried by the frame, a foldable chute affixed to the hopper, a second chute pivotally associated with the first mentioned chute, means for folding up the first mentioned chute, and independent means for swinging the second mentioned chute about the pivot point thereof.

In testimony whereof I affix my signature.

LOOMIS L. KELLY.